United States Patent
Poe et al.

(10) Patent No.: US 9,972,830 B2
(45) Date of Patent: May 15, 2018

(54) METHOD FOR THE RECOVERY OF LITHIUM COBALT OXIDE FROM LITHIUM ION BATTERIES

(75) Inventors: Sarah L. Poe, Wilmington, MA (US); Christopher L. Paradise, Wilmington, MA (US); Laura R. Muollo, Wilmington, MA (US); Reshma Pal, Wilmington, MA (US); John C. Warner, Wilmington, MA (US); Michael B. Korzenski, Bethel, CT (US)

(73) Assignee: Warner Babcock Institute for Green Chemistry, LLC, Wilmington, MA (US)

( * ) Notice: Subject to any disclaimer, the term of this patent is extended or adjusted under 35 U.S.C. 154(b) by 993 days.

(21) Appl. No.: 14/127,714

(22) PCT Filed: Jun. 19, 2012

(86) PCT No.: PCT/US2012/043119
§ 371 (c)(1),
(2), (4) Date: Mar. 27, 2014

(87) PCT Pub. No.: WO2012/177620
PCT Pub. Date: Dec. 27, 2012

(65) Prior Publication Data
US 2014/0306162 A1  Oct. 16, 2014

Related U.S. Application Data

(60) Provisional application No. 61/499,498, filed on Jun. 21, 2011.

(51) Int. Cl.
*B03D 1/02* (2006.01)
*H01M 4/1391* (2010.01)
(Continued)

(52) U.S. Cl.
CPC .......... *H01M 4/1391* (2013.01); *B03D 1/006* (2013.01); *B03D 1/008* (2013.01); *B03D 1/02* (2013.01);
(Continued)

(58) Field of Classification Search
None
See application file for complete search history.

(56) References Cited

U.S. PATENT DOCUMENTS

| 2,535,345 | A | 12/1950 | Bishop et al. |
| 3,770,213 | A | 11/1973 | Lynn et al. |

(Continued)

FOREIGN PATENT DOCUMENTS

| CA | 2 337 535 A | 1/2000 |
| DE | 4424825 A1 | 1/1996 |

(Continued)

OTHER PUBLICATIONS

Yokoyama, Yukie, et al., Fundamental Studies on the Action of Frothing Agents in Sulphide Mineral Flotation, Flotation, 1976, pp. 67-73, vol. 23.

(Continued)

*Primary Examiner* — Thomas M Lithgow
(74) *Attorney, Agent, or Firm* — Cermak Nakajima & McGowan LLP; Malcolm K. McGowan

(57) ABSTRACT

A method of recovering lithium cobalt oxide from spent lithium ion batteries, wherein said method is more environmentally friendly than the methods presently known in the art. The method includes a froth flotation step using renewable and biodegradable solvents such as terpenes and formally hydrated terpenes. The method can also include a relithiation step to return the Li:Co ratio back to about 1:1 for use in second-life applications.

17 Claims, 1 Drawing Sheet

(51) Int. Cl.
B03D 1/006 (2006.01)
B03D 1/008 (2006.01)
H01M 10/54 (2006.01)
H01M 4/48 (2010.01)
H01M 4/58 (2010.01)
H01M 4/587 (2010.01)
H01M 4/62 (2006.01)
H01M 10/0525 (2010.01)
H01M 4/04 (2006.01)
H01M 4/1393 (2010.01)

(52) U.S. Cl.
CPC ........... *H01M 4/04* (2013.01); *H01M 4/1393* (2013.01); *H01M 4/48* (2013.01); *H01M 4/58* (2013.01); *H01M 4/587* (2013.01); *H01M 4/625* (2013.01); *H01M 10/0525* (2013.01); *H01M 10/54* (2013.01); *Y02W 30/84* (2015.05)

(56) References Cited

U.S. PATENT DOCUMENTS

| | | | |
|---|---|---|---|
| 4,732,669 A * | 3/1988 | Nimerick | B03D 1/01 209/166 |
| 4,988,417 A | 1/1991 | Deyoung et al. | |
| 5,614,484 A | 3/1997 | Panandiker | |
| 5,888,463 A | 3/1999 | McLaughlin et al. | |
| 5,944,980 A | 8/1999 | Yoshimura et al. | |
| 6,447,669 B1 | 9/2002 | Lain | |
| 6,514,311 B1 | 2/2003 | Lin et al. | |
| 6,844,103 B2 | 1/2005 | Lee et al. | |
| 7,169,206 B2 | 1/2007 | Cheret et al. | |
| 7,198,865 B2 | 4/2007 | Sloop | |
| 7,713,396 B2 | 5/2010 | Kakuta et al. | |
| 7,820,317 B2 | 10/2010 | Tedjar et al. | |
| 2001/0028871 A1 | 10/2001 | Harrison et al. | |
| 2005/0244704 A1 | 11/2005 | Sloop et al. | |
| 2010/0120104 A1 | 5/2010 | Reed | |
| 2010/0203366 A1* | 8/2010 | Sloop | H01M 4/485 429/49 |
| 2011/0100832 A1 | 5/2011 | Lubomirsky et al. | |

FOREIGN PATENT DOCUMENTS

| | | |
|---|---|---|
| JP | H06-510077 A | 11/1994 |
| JP | 2002-520257 A | 7/2002 |
| JP | 2005028249 A | 2/2005 |
| JP | 2005-028249 A | 3/2005 |
| JP | 2005-186057 A | 7/2005 |
| JP | 2005186057 A | 7/2005 |
| JP | 2009-275297 A | 11/2009 |
| TW | 201306358 A1 | 2/2013 |
| WO | 9712998 A1 | 4/1997 |
| WO | 2007026322 A2 | 3/2007 |
| WO | 2011035915 A1 | 3/2011 |
| WO | 2011143061 A1 | 11/2011 |

OTHER PUBLICATIONS

Japanese Office Action, dated Aug. 25, 2016.
International Search Report, dated Dec. 17, 2012.
Li, Li et al., "Recovery of cobalt and lithium from spent lithium ion batteries using organic citric acid as leachant," Journal of Hazardous Materials, 2010, pp. 288-293, vol. 176.
Li, Li et al., "Environmental friendly leaching reagent for cobalt and lithium recovery from spent lithium-ion batteries," Waste Management, 2010, pp. 2615-2621, vol. 30.
Kazmi, Kamran Raza, et al.; "Kish Beneficiation by Flotation," J. Chem. Soc. Pak, 2008, pp. 11-16, vol. 30.
Rabah, M.A., et al.; "Recovering Metal Values Hydrometallurgically from Spent Dry Batter Cells," Journal of Metallurgy, 1999, pp. 41-43, vol. 51.
Supplemental European Search Report, dated Dec. 22, 2014.
Chinese Office Action, dated Jul. 14, 2015.
Yokoyama, Yukie et al, "Fundamental Studies on the Action of Frothing Agents in Sulphide Mineral Floatation," Fusen, Japan, 23 (2), 67-73.

* cited by examiner

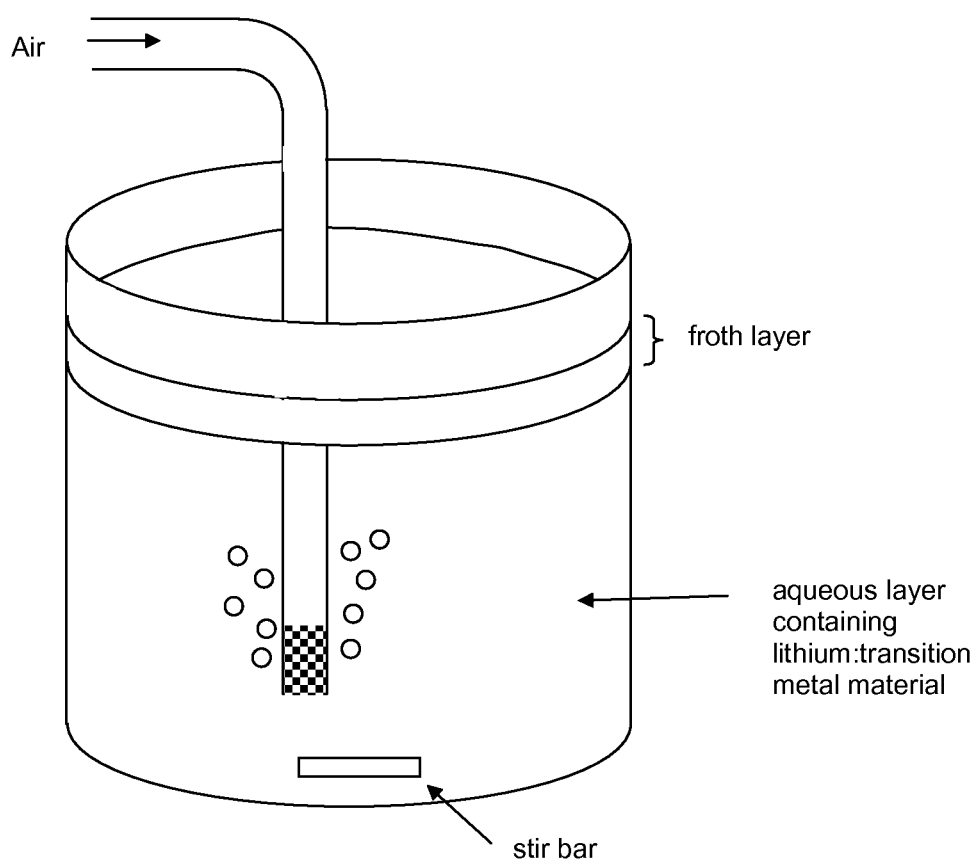

METHOD FOR THE RECOVERY OF LITHIUM COBALT OXIDE FROM LITHIUM ION BATTERIES

CROSS-REFERENCE TO RELATED APPLICATIONS

This application is filed under the provisions of 35 U.S.C. § 371 and claims the priority of International Patent Application No. PCT/US2012/043119 filed on 19 Jun. 2012 entitled "METHOD FOR THE RECOVERY OF LITHIUM COBALT OXIDE FROM LITHIUM ION BATTERIES" in the name of Sarah L. Poe, et al., which claims priority to U.S. Provisional Patent Application No. 61/499,498, filed on 21 Jun. 2011, both of which are hereby incorporated by reference herein in their entirety.

FIELD

The present invention relates generally to a method for directly recovering lithium-transition metal species from lithium-ion batteries. In particular, the present invention relates to a method for directly recovering lithium cobalt oxide from lithium ion batteries, preferably spent lithium ion batteries. The recovered lithium cobalt oxide material can be relithiated to attain a useful Li:Co ratio for secondary use.

DESCRIPTION OF THE RELATED ART

Presently, well known rechargeable battery technologies include Lithium-Ion (Li-ion), Nickel Cadmium (NiCd), and Nickel Metal Hydride (NiMH). Each battery includes multiple cells that typically comprise electrodes and an ion conducting electrolyte therebetween. For example, the rechargeable lithium-ion cell, known as a rocking chair type lithium-ion battery, typically comprises essentially two electrodes, an anode and a cathode, and a non-aqueous lithium ion conducting electrolyte therebetween. The anode (negative electrode) is a carbonaceous electrode that is capable of intercalating lithium ions. The cathode (positive electrode), a lithium retentive electrode, is also capable of intercalating lithium ions. The carbon anode comprises any of the various types of carbon (e.g., graphite, coke, carbon fiber, etc.) which are capable of reversibly storing lithium species, and which are bonded to an electrochemically conductive current collector (e.g., copper foil) by means of a suitable organic binder (e.g., polyvinylidine fluoride, PVdF). The cathode comprises such materials as transition metals and chalcogenides that are bonded to an electrochemically conducted current collector (e.g., aluminum foil) by a suitable organic binder. Chalcogenide compounds include oxides, sulfides, selenides, and tellurides of such metals as vanadium, titanium, chromium, copper, molybdenum, niobium, iron, nickel, cobalt, and manganese. Lithiated transition metal oxides are, at present, the preferred positive electrode intercalation compounds. Examples of suitable cathode materials include $LiMn_2O_4$, $LiCoO_2$, $LiNiO_2$, and $LiFePO_4$, their solid solutions and/or their combination with other metal oxides and dopant elements, e.g., titanium, magnesium, aluminum, boron, etc.

Some industrial processes have been developed to recycle spent lithium-ion batteries. One commercial recycling process involves reducing the reactivity of said batteries by lowering the temperature using cryogenic liquids such as nitrogen or argon and communiting the cooled batteries. The frozen batteries are then immersed under a large volume of aqueous caustic solution made of hydroxide salts and sodium carbonate. Active cell materials, such as lithium, react to release hydrogen and heat. Under these harsh conditions, hydrogen ignites, burning all flammable organic solvents. In addition, the process requires an acid dissolution step. At the end of the process, cobalt oxide and lithium carbonate, and in a lesser extent, paper and plastics, carbon black, and metal scrap are also recovered as secondary by-products. Another method involves the recovery of cobalt oxide from spent Li-ion batteries. The process involves the calcination of spent cells and utilizes the cogeneration resulting from burning electrolytes. Cobalt oxide is recovered for reuse directly in the fabrication of new Li-ion batteries. Another method relies primarily on the acid dissolution of lithium and cobalt followed by the precipitation of the metals independently as their salts or oxides. Disadvantageously, the acid dissolution process requires the use of a harsh acid and results in byproducts such as chlorine gas, sulfur trioxide and nitrous oxides ($NO_x$).

There is a need in the art for a method capable of recovering lithium cobalt oxide directly, wherein said method is more environmentally friendly than the presently known methods of lithium ion battery recycling.

SUMMARY

The present invention generally relates to a method for directly recovering lithium-transition metal species from lithium-ion batteries. In particular, the present invention relates to a method for directly recovering lithium cobalt oxide from lithium ion batteries, preferably lithium ion batteries. The recovered lithium cobalt oxide material can be relithiated to attain a useful Li:Co ratio for secondary use.

In one aspect, a method of separating carbon from at least one lithium:transition metal material is described, said method comprising contacting a solid mass comprising said carbon and at least one lithium:transition metal material with a formulation comprising at least one frothing agent and at least one collecting agent to form a mixture, introducing gas through the mixture in order to generate a froth layer, and separating the froth layer from a liquid layer, wherein the froth layer comprises the carbon and the liquid layer comprises the at least one lithium:transition metal material.

In another aspect, a method of separating carbon from at least one lithium:transition metal material is described, the method comprising:
(a) contacting a solid mass comprising said carbon and at least one lithium:transition metal material with a formulation, said formulation comprising at least one frothing agent and at least one collecting agent to form a mixture;
(b) generating a froth layer and a liquid layer; and
(c) separating the froth layer from a liquid layer, wherein the froth layer comprises the carbon and the liquid layer comprises the at least one lithium:transition metal material.

Other aspects, features and advantages of the invention will be more fully apparent from the ensuing disclosure and appended claims.

BRIEF DESCRIPTION OF THE DRAWINGS

FIG. 1 illustrates a generalized froth flotation apparatus for the purification of lithium cobalt oxide from used lithium ion batteries.

DETAILED DESCRIPTION AND PREFERRED EMBODIMENTS THEREOF

The present invention generally relates to methods for directly recovering lithium-transition metal materials, e.g., lithium cobalt oxide, from lithium-ion batteries, e.g., spent lithium-ion batteries. The recovered lithium cobalt oxide material can be relithiated to attain a useful Li:Co ratio for secondary use.

As defined herein, "lithium:transition metal materials" correspond to compounds comprising lithium and transition metals such as cobalt, iron, manganese, and nickel, including, but not limited to, lithium cobalt oxide ($LiCoO_2$), lithium iron phosphate, lithium iron oxide, lithium manganese oxide ($LiMnO_2$), lithium nickel oxide, and lithium nickel cobalt aluminum oxide. Advantageously, the method described herein is capable of recovering the lithium:transition metal material, regardless of the transition metal that is paired with the lithium. In a particularly preferred embodiment, the transition metal comprises cobalt. Most preferably, the lithium:transition metal material comprises lithium cobalt oxide.

As defined herein, "substantially devoid" corresponds to less than about 2 wt. %, more preferably less than 1 wt. %, and most preferably less than 0.1 wt. % of the composition, based on the total weight of said composition.

As defined herein, "relithiation" is the process of taking material comprising lithium and a transition metal and increasing the atomic ratio of lithium to transition metal from less than 1:1 up to about 1:1.

As defined herein, "carbon" includes crystalline graphite, amorphous graphite, graphene, pyrolytic graphite, graphite oxide, graphite fibers, carbon nanotubes, conductive carbon, graphitized carbon, or any carbonaceous species that includes the alpha (hexagonally arranged carbon atoms) or beta (rhombohedrally arranged carbon atoms) form of graphite.

As defined herein, a "strong acid" includes sulfuric acid, nitric acid, perchloric acid, hydrochloric acid, hydrobromic acid, and hydroiodic acid.

Generally speaking, lithium ion-batteries, particularly lithium metal gel and solid polymer electrolyte rechargeable batteries, comprise at least one negative electrode active material, a separator, an electrolyte, one positive electrode active material, a current collector and a cell casing. The process of recycling said batteries includes the steps of manually or mechanically opening the batteries, communiting (e.g., shredding) the electrochemical cells (ECs) into smaller pieces in an inert atmosphere before further processing. Larger fractions can be separated from the finer fractions. The communited finer fraction comprises carbon, lithium:transition metal material, and polymer binder, e.g., polyvinylidene fluoride. The shredded matter is processed to remove the polymer binder. Thereafter, the novel method described herein comprises a froth flotation step to separate the carbon from the lithium:transition metal material using at least one organic solvent. At the completion of froth flotation, the froth can be separated from the liquid, wherein the liquid comprises the lithium:transition metal material and the froth comprises carbon. Advantageously, the process does not require the use of any strong acids (i.e., sulfuric, nitric, perchloric, hydrochloric, hydrobromic or iodic).

Although communiting in an inert atmosphere such as argon, carbon dioxide or nitrogen is preferred for increased energy efficiency, cryogenic shredding is a possible technique to obtain communited lithium-ion battery waste. For example, the combination of a cryogenic fluid with a rotary cutting mill will harden soft cell materials to render them brittle and easy to grind, and ensure safe operating conditions by maintaining an inert atmosphere around the rotary cutting mill. Cryogenic shredding is normally performed using a cutting mill with sharp knives made of tool steel or hard cemented carbides preferably operating under a continuous flow of liquid argon. The cuttings produced are usually smaller than 1 millimeter. Oversize cuttings are removed by screening under argon and are recycled to the cutting mill. Argon can be recovered by evaporation as is well known to those skilled in the art and a mass of cool shredded spent ECs are released at the bottom of the container.

Subsequent to shredding, a fine powder exists which comprises carbon, lithium:transition metal material, and polymer binder (e.g., polyvinylidene fluoride). Preferably, the polymer binder is separated from the powder to produce a solid mass that is substantially devoid of polymer binder. Polymer binder can be removed from the powder by dissolving same in a solvent or a solvent/surfactant composition. For example, the polymer binder can be separated from the powder by dissolving same in a non-teratogenic solvent, however, the use of teratogenic solvents is contemplated. If teratogenic solvents are used, said teratogenic solvent can be recovered and reused to minimize waste. Alternatively, polymer binder can be removed from the powder by incinerating the powder. In still another alternative, the polymer binder can be removed from the powder using supercritical fluid techniques, as well known in the art. In still another alternative, the polymer binder can be removed from the powder using biphasic extraction system techniques, which can be performed in flow for continuous processing. Following removal of the polymer binder, the remaining solid mass comprises carbon and lithium:transition metal material and preferably, said solid mass is dried prior to further processing. Rinsing is also contemplated when the solvent is a high boiling point solvent and replacing the high boiling point solvent with a more volatile solvent will facilitate drying.

For the purposes of this disclosure, the solvent for dissolving the polymer binder comprises a species selected from the group consisting of alcohols, ethers, pyrrolidinones, glycols, carboxylic acids, glycol ethers, amines, ketones, aldehydes, alkanes, alkenes, alkynes, amides, and ketones, such as methanol, ethanol, isopropanol, butanol, and higher alcohols (including diols, triols, etc.), toluene, 2,2,3,3,4,4,5,5-octafluoro-1-pentanol, 1H,1H,9H-perfluoro-1-nonanol, perfluoroheptanoic acid, 1H,1H,7H-dodecafluoro-1-heptanol, perfluoropentanoic acid, 1H,1H,8H,8H-dodecafluoro-1,8-octanediol, 2,2,3,3,4,4,5,5-octafluoro-1,6-hexanediol, 5H-perfluoropentanoic acid, n-butyl heptafluorobutyrate, tetrahydrofuran (THF), N-methylpyrrolidinone (NMP), cyclohexylpyrrolidinone, N-octylpyrrolidinone, N-phenylpyrrolidinone, 2-pyrrolidone, methyl formate, dimethyl formamide (DMF), dimethylsulfoxide (DMSO), tetramethylene sulfone (sulfolane), dimethyl sulfone, diethyl ether, cyclopentyl methyl ether, tetrahydrofurfural alcohol, furfural, phenoxy-2-propanol (PPh), propriophenone, ethyl lactate, ethyl acetate, ethyl benzoate, acetonitrile, acetone, ethylene glycol, propylene glycol, dioxane, β-butyryl lactone, γ-butyryl lactone, γ-caprolactone, ε-caprolactone, δ-hexalactone, α-angelicalactone, undecanoic γ-lactone, cyclohexanone, acetylacetone, 3-pentanone, acetone, 5-hydroxy-2-pentanone, 2,5-hexanedione, 4-hydroxy-4-methyl-2-pentanone, butanone, 2-methyl-2-butanone, 4-hydroxy-2-butanone, cyclopentanone, 2-pentanone, 1-phenylethanone, benzophenone, 2-hexanone, 3-hexanone, 2-heptanone, 4-heptanone, ethyl n-butyl ketone, ethyl n-amyl ketone, methyl isopropyl ketone, diethylketone, dicyclohexyl ketone, 2,6-dimethylcyclohexanone, 2-acetylcyclohexanone, 2,4-pentanedione, dibasic esters, dimethyl glutarate, dimethyl adipate, dimethyl succinate, diethyl phthalate, diethyl succinate, dibutyl succinate, diethyl adipate, diethyl glutarate, dibutyl phthalate, diethyl tartarate, diocytl phthalate, butylene carbonate, ethylene carbonate, propylene carbonate, glycerine carbonate, dipropylene glycol, diethylene glycol, triethylene glycol, dimethyl acetamide, acetophenone, 3,4-dihydro-2H-pyran, 4-methyl-2-pentanone, diethylene glycol monomethyl ether, triethylene glycol monomethyl ether, diethylene glycol monoethyl ether, triethylene glycol monoethyl ether, ethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol phenyl ether, propylene glycol, dipropylene glycol methyl ether (DPGME), tripropylene glycol methyl ether, dipropylene glycol dimethyl ether, dipropylene glycol ethyl ether, propylene glycol n-propyl ether, dipropylene glycol n-propyl ether (DPGPE), tripropylene glycol n-propyl ether, propylene glycol n-butyl ether, dipropylene glycol n-butyl ether, tripropylene glycol n-butyl ether, propylene glycol phenyl ether, and combinations thereof. In one embodiment, the solvent comprises NMP, dibasic esters, alkylene carbonates, glycerine carbonate, propylene carbonate, butylene carbonate, or combinations thereof.

Suitable surfactants for the solvent/surfactant composition can include fluorosurfactants, ethoxylated fluorosurfactants, polyoxyethylene-polyoxypropylene block co-polymers, alkylphenol ethoxylates, castor oil ethoxylates, fatty acid ethoxylates, alkyl ethoxylates, alkylphenyl ethoxylates, polyoxyethyleneglycol dodecyl ethers, fluorinated polyethers, as well as combinations comprising at least one of the foregoing. For example, the surfactant may be an ethoxylated fluorosurfactant such as ZONYL® FSO-100 or FSN-100 fluorosurfactants (DuPont Canada Inc., Mississauga, Ontario, Canada), a polyoxyethylene-polyoxypropylene block co-polymers such as PLURONIC® 17R4 or 25R4 (BASF), a polyoxyethyleneglycol dodecyl ether such as BRIJ® 35P, a alkylphenol ethoxylate such as TRITON® X-100, a castor oil ethoxylate such as SURFONIC® CO (Huntsmen Chemical, Texas, USA), a fatty acid ethoxylate such as SURFONIC® E-400 MO (Huntsmen Chemical, Texas, USA), DYNOL® 604 (Air Products), a fluorinated polyether such as POLYFOX™ PF-159 (Omnova Solutions, Inc.), and combinations thereof. Alternatively, or in addition, the surfactant may comprises a sucrose ester (e.g., sucrose stearate, sucrose palmitate, sucrose cocoate, sucrose laurate, sucrose distearate, sucrose dipalmitate, sucrose dicocoate, sucrose dilaurate, mixed diesters, and mixtures thereof), an ethoxylated fatty alcohol, a polyethoxylated fatty alcohol, a glycerol mono-fatty acid ester, a fatty acid ester of polyethylene glycol, a polyethoxylated sorbitan fatty acid ester, an alkylglycosides, an alkylpolyoside, a mid-chain branched alcohol, polyvinyl alcohols, ethers, pyrrolidones, monoglycerides, sorbitan esters (e.g., sorbitan monolaurate, sorbitan monopalmitate, sorbitan monostearate, sorbitan tristearate, sorbitan monooleate, sorbitan trioleate), polysorbate surfactants (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene sorbitan trioleate, polyoxyethylene sorbitan tristearate) non-hydroxyl-terminated non-ionic surfactants and combinations thereof. When present, preferably, the surfactant comprises ZONYL® FSO-100, FSN-100, PLURONIC® 17R4, PLURONIC® 25R4, BRIJ® 35P, SURFONIC® CO-42, SURFONIC® E-400 MO, POLYFOX™ PF-159 and combinations thereof.

Following removal of the polymeric binder, the remaining solid mass comprises carbon and at least one lithium:transition metal compound. Accordingly, in one aspect, a method of separating carbon from lithium:transition metal material is described, said method based on froth flotation. Froth flotation employs a frothing agent, which generates a stable foamy layer (the "froth") on top of an aqueous column, and a collector which serves to concentrate either the desired compound or the undesired impurities in the froth layer. In one embodiment, a method of separating carbon from at least one lithium:transition metal material is described, the method comprising contacting a solid mass comprising said carbon and at least one lithium:transition metal material with a formulation, said formulation comprising at least one frothing agent and at least one collecting agent to form a mixture; generating a froth layer and a liquid layer; and separating the froth layer from a liquid layer, wherein the froth layer comprises the carbon and the liquid layer comprises the at least one lithium:transition metal material. In another embodiment, a method of separating carbon from at least one lithium:transition metal material comprising $LiCoO_2$ is described, the method comprising contacting a solid mass comprising said carbon and at least one lithium:transition metal material comprising $LiCoO_2$ with a formulation, said formulation comprising at least one frothing agent and at least one collecting agent to form a mixture; generating a froth layer and a liquid layer; and separating the froth layer from a liquid layer, wherein the froth layer comprises the carbon and the liquid layer comprises the at least one lithium:transition metal material comprising $LiCoO_2$. In still another embodiment, a method of separating carbon from lithium:transition metal material is described, said method comprising contacting a solid mass comprising said carbon and at least one lithium:transition metal material with a formulation comprising at least one frothing agent and at least one collecting agent to form a mixture, introducing gas through the mixture in order to generate a froth layer, and separating the froth layer from a liquid layer, wherein the froth layer comprises the carbon and the liquid layer comprises the at least one lithium:transition metal material. In one embodiment, a method of separating carbon from at least one lithium:transition metal material comprising $LiCoO_2$, said method comprising contacting a solid mass comprising said carbon and at least one lithium:transition metal material comprising $LiCoO_2$ with a formulation comprising at least one frothing agent and at least one collecting agent to form a mixture, introducing gas through the mixture in order to generate a froth layer, and separating the froth layer from a liquid layer, wherein the froth layer comprises the carbon and the liquid layer comprises at least one lithium:transition metal material comprising $LiCoO_2$. Advantageously, the process does not require the use of any strong acids. Preferably, the liquid layer is aqueous. A generalized schematic of the froth flotation apparatus is illustrated in FIG. 1.

Although not wishing to be bound by theory, the frothing agent is thought to reduce the surface tension of the water to stabilize the rising air bubbles into a layer of foam on which hydrophilic materials, e.g., carbon, collect. The at least one frothing agent is preferably environmentally friendly and comprises formally hydrated terpenes including, but not limited to, terpineols, citronellol, menthol, linalool, borneol, isoborneol, fenchyl alcohol, dihydromyrcenol, nerol, and combinations thereof, as illustrated below. Other frothing agents known in the art include methyl isobutyl carbinol (MIBC), however, the frothing agent described herein preferably is substantially devoid of methyl isobutyl carbinol and other frothing agents derived from non-renewable resources. Preferably, the frothing agent comprises a terpineol.

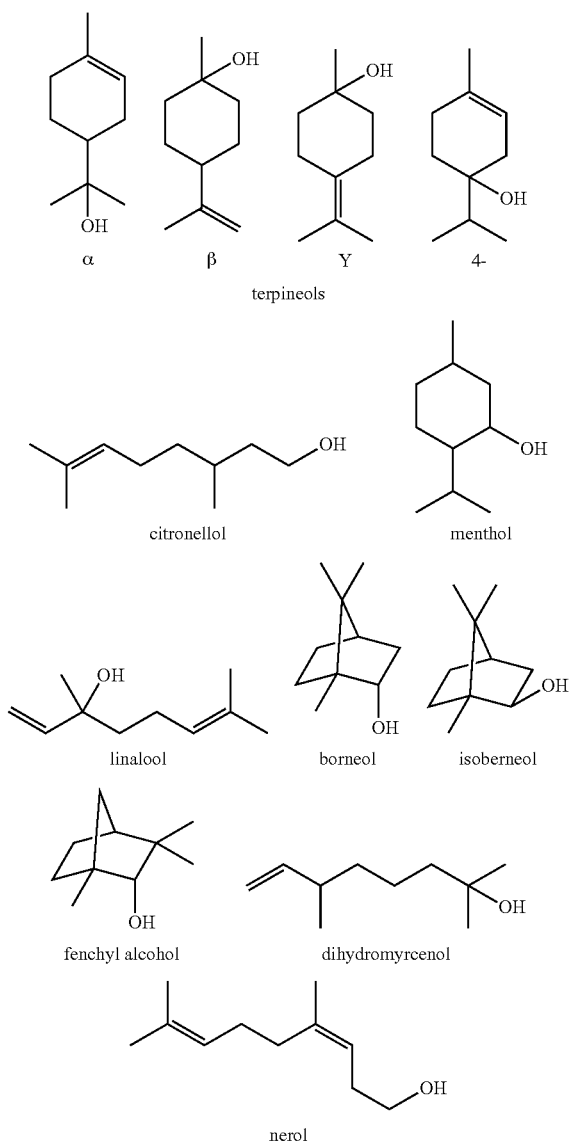

Although not wishing to be bound by theory, the collecting agent is thought to preferentially adsorb to one of the components in the mixture, e.g., carbon, rendering it more hydrophobic so that it associates with the rising air bubbles. At least one collecting agent is preferably environmentally friendly and comprises unsaturated hydrocarbon terpenes including, but not limited to, limonene, phellandrenes, terpinenes, pinene, camphene, car-3-ene, sabinene, thujenes, allo-ocimene, ocimenes, myrcene, dihydromyrcene, and combinations thereof, as illustrated below. The collecting agent preferably is substantially devoid of kerosene and other collecting agents derived from non-renewable resources. Preferably, the collecting agent comprises limonene.

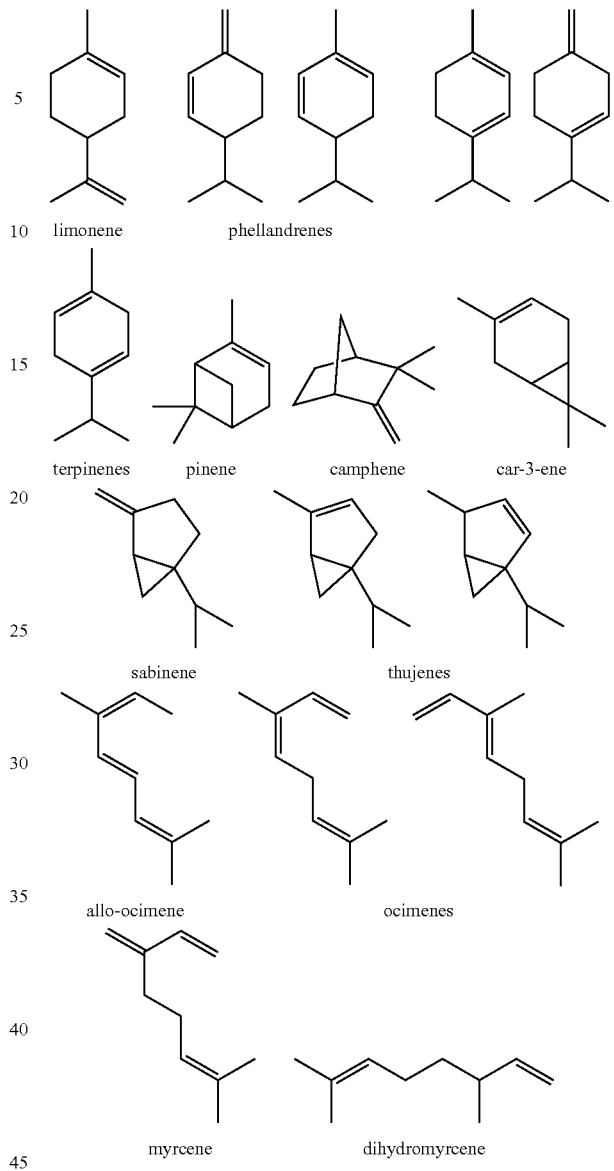

Preferably, the collecting agent comprises limonene and the frothing agent comprises a terpineol, i.e., an α-, β-, γ-, 4-terpineol, or any combination thereof. Advantageously, limonene is derived from citrus oil and is renewable and biodegradeable, and the flash point of terpineol is higher than that of methyl isobutyl carbinol. Accordingly, in another embodiment, a method of separating carbon from lithium:transition metal material is described, said method comprising contacting a solid mass comprising said carbon and at least one lithium:transition metal material with a formulation comprising at least one frothing agent and limonene to form a mixture, introducing gas through the mixture in order to generate a froth layer, and separating the froth layer from a liquid layer, wherein the froth layer comprises the carbon and the liquid layer comprises the at least one lithium:transition metal material. In still another embodiment, a method of separating carbon from at least one lithium:transition metal material is described, said method comprising contacting a solid mass comprising said carbon and at least one lithium:transition metal material with a formulation comprising terpineol and at least one collecting agent to form a mixture, introducing gas through the mixture in order to generate a froth layer, and separating the froth layer from a liquid layer, wherein the froth layer comprises the carbon and the liquid layer comprises the at least one lithium:transition metal material. In yet another embodiment, a method of separating carbon from at least one lithium:transition metal material is described, said method comprising contacting a solid mass comprising said carbon and at least one lithium:transition metal material with a formulation comprising terpineol and limonene to form a mixture, introducing gas through the mixture in order to generate a froth layer, and separating the froth layer from a liquid layer, wherein the froth layer comprises the carbon and the liquid layer comprises the at least one lithium: transition metal material. In still another embodiment, a method of separating carbon from at least one lithium: transition metal material comprising LiCoO$_2$, said method comprising contacting a solid mass comprising said carbon and at least one lithium:transition metal material comprising LiCoO$_2$ with a formulation comprising at least one frothing agent and limonene to form a mixture, introducing gas through the mixture in order to generate a froth layer, and separating the froth layer from a liquid layer, wherein the froth layer comprises the carbon and the liquid layer comprises at least one lithium:transition metal material comprising LiCoO$_2$. In yet another embodiment, a method of separating carbon from at least one lithium:transition metal material comprising LiCoO$_2$, said method comprising contacting a solid mass comprising said carbon and at least one lithium:transition metal material comprising LiCoO$_2$ with a formulation comprising terpineol and at least one collecting agent to form a mixture, introducing gas through the mixture in order to generate a froth layer, and separating the froth layer from a liquid layer, wherein the froth layer comprises the carbon and the liquid layer comprises at least one lithium:transition metal material comprising LiCoO$_2$. In yet another embodiment, a method of separating carbon from at least one lithium:transition metal material comprising LiCoO$_2$, said method comprising contacting a solid mass comprising said carbon and at least one lithium:transition metal material comprising LiCoO$_2$ with a formulation comprising terpineol and limonene to form a mixture, introducing gas through the mixture in order to generate a froth layer, and separating the froth layer from a liquid layer, wherein the froth layer comprises the carbon and the liquid layer comprises at least one lithium:transition metal material comprising LiCoO$_2$. Advantageously, the process does not require the use of any strong acids. Preferably, the liquid layer is aqueous.

The solid mass comprising the carbon and lithium:transition metal material can be dry or can be present as a slurry in water. The mixture comprising the carbon, lithium:transition metal material, at least one frothing agent and at least one collecting agent is preferably agitated, e.g., stirred, as readily understood by the skilled artisan. Flotation can be performed at room temperature in rectangular or cylindrical mechanically agitated cells or tanks, flotation columns, Jameson cells or deinking flotation machines. It should be appreciated that the gas introduced to produce the froth can comprise conventional air, nitrogen, oxygen, argon, helium, carbon dioxide, dinitrogen monoxide, hydrogen, and any combination thereof. Preferably the gas comprises conventional air and the froth is produced by bubbling. It should be appreciated by the skilled artisan that the bubbling rate is easily determined to effectuate the formation of the froth. Gas can be introduced to the cells, tanks, or columns using fritted tubes. The froth layer can be easily separated from the liquid layer by "skimming" or otherwise scraping the froth off of the liquid layer, as readily understood by the skilled artisan. In addition, the froth layer can be allowed to overflow the rim of the cell or container without skimming or scraping. Following separation of the froth layer from the liquid layer, the froth layer can be processed to reclaim the concentrated carbonaceous material contained therein, and the liquid layer can be processed to reclaim the at least one lithium:transition metal material contained at the bottom of the liquid layer. Preferably, the liquid layer is aqueous.

Advantageously, limonene can be converted to terpineol by treatment with trifluoroacetic acid (TFA) according to the reaction:

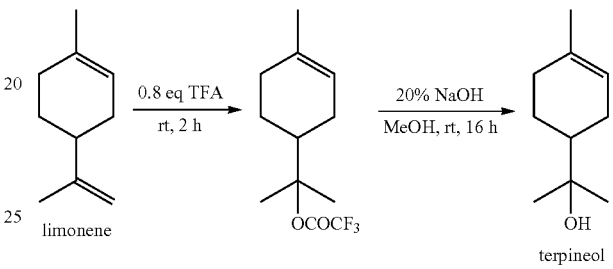

After the reaction reaches approximately 50% conversion, said mixture of limonene and terpineol can be used in the method of separating carbon from at least one lithium: transition metal material. Accordingly, in another embodiment, a method of separating carbon from at least one lithium:transition metal material is described, said method comprising contacting a solid mass comprising said carbon and at least one lithium:transition metal material with at least one collecting agent and at least one frothing agent, wherein the collecting agent is converted to a mixture of collecting agent and frothing agent prior to the contact of same with said solid mass, introducing gas through the mixture in order to generate a froth layer, and separating the froth layer from a liquid layer, wherein the froth layer comprises the carbon and the liquid layer comprises the at least one lithium:transition metal material. In one embodiment, a method of separating carbon from at least one lithium:transition metal material comprising LiCoO$_2$, said method comprising contacting a solid mass comprising said carbon and at least one lithium:transition metal material comprising LiCoO$_2$ with at least one collecting agent and at least one frothing agent, wherein the collecting agent is converted to a mixture of collecting agent and frothing agent prior to the contact of same with said solid mass, introducing gas through the mixture in order to generate a froth layer, and separating the froth layer from a liquid layer, wherein the froth layer comprises the carbon and the liquid layer comprises at least one lithium:transition metal material comprising LiCoO$_2$. Preferably, the liquid layer is aqueous. Advantageously, the process does not require the use of any strong acids. In one embodiment, the collecting agent is converted to the mixture of collecting agent and frothing agent in situ in the presence of the solid mass.

In another embodiment, a method of separating carbon from at least one lithium:transition metal material is described, said method comprising contacting a solid mass comprising said carbon and at least one lithium:transition metal material with a formulation comprising at least one frothing agent and at least one collecting agent to form a mixture, introducing gas through the mixture in order to generate a froth layer, adding water to the mixture, and separating the froth layer from an aqueous layer, wherein the froth layer comprises the carbon and the liquid layer comprises the at least one lithium:transition metal material. In one embodiment, a method of separating carbon from at least one lithium:transition metal material comprising $LiCoO_2$, said method comprising contacting a solid mass comprising said carbon and at least one lithium:transition metal material comprising $LiCoO_2$ with a formulation comprising at least one frothing agent and at least one collecting agent to form a mixture, adding water to the mixture, introducing gas through the mixture in order to generate a froth layer, and separating the froth layer from an aqueous layer, wherein the froth layer comprises the carbon and the aqueous layer comprises at least one lithium:transition metal material comprising $LiCoO_2$. It should be appreciated that the formulation can comprise just the at least one collecting agent, wherein the collecting agent is converted in situ to a mixture of collecting agent and frothing agent. Preferably, the collecting agent comprises limonene. Preferably, the frothing agent comprises terpineol. Advantageously, the process does not require the use of any strong acids.

Accordingly, in another aspect, a method of recycling a lithium ion-battery to obtain a lithium:transition metal material is described, said method comprising:
(a) separating a fraction from other components of the lithium-ion battery, wherein the fraction comprises at least one lithium:transition metal material, carbon and polymer binder,
(b) separating the polymer binder from the fraction to yield a solid mass comprising at least one lithium:transition metal material and carbon,
(c) contacting the solid mass with a formulation comprising at least one frothing agent and at least one collecting agent to form a mixture,
(d) introducing gas through the mixture in order to generate a froth layer,
(e) optionally adding water to the mixture;
(f) separating the froth layer from a liquid layer, wherein the froth layer comprises the carbon and the liquid layer comprises the at least one lithium:transition metal material, and
g) separating the at least one lithium:transition metal material from the liquid layer.
Preferably, the collecting agent comprises limonene. Preferably, the frothing agent comprises terpineol. Preferably, the liquid layer is aqueous. Advantageously, the process does not require the use of any strong acids.

In one embodiment, a method of recycling a lithium-ion battery to obtain at least one lithium:transition metal material comprising $LiCoO_2$ is described, said method comprising:
(a) separating a fraction from other components of the lithium-ion battery, wherein the fraction comprises at least one lithium:transition metal material comprising $LiCoO_2$, carbon and polymer binder,
(b) separating the polymer binder from the fraction to yield a solid mass comprising at least one lithium:transition metal material comprising $LiCoO_2$ and carbon,
(c) contacting the solid mass with a formulation comprising at least one frothing agent and at least one collecting agent to form a mixture,
(d) introducing gas through the mixture in order to generate a froth layer,
(e) optionally adding water to the mixture;
(f) separating the froth layer from a liquid layer, wherein the froth layer comprises the carbon and the liquid layer comprises the at least one lithium:transition metal material comprising $LiCoO_2$, and
(g) separating the at least one lithium:transition metal material comprising $LiCoO_2$ from the liquid layer.
Preferably, the collecting agent comprises limonene. Preferably, the frothing agent comprises terpineol. Preferably, the liquid layer is aqueous. Advantageously, the process does not require the use of any strong acids.

Following the separation of the carbon from the at least one lithium:transition metal material (e.g., $LiCoO_2$), the at least one lithium:transition metal material that is in the liquid layer can be filtered and collected. During the lifecycle of a lithium ion battery, the lithium:transition metal material becomes delithiated to $Li_{(1-x)}MY$, where M is the transition metal and Y is the counterbalancing anion. Accordingly, the $Li_{(1-x)}MY$ can be relithiated to restore the Li:M ratio to about 1:1. For example, assuming the lithium:transition metal material is $LiCoO_2$, during the lifetime of the battery, it is delithiated to $Li_{(1-x)}CoO_2$ and it can be relithiated to $LiCoO_2$ by combining with $Li_2CO_3$ to restore the Li:Co ratio to 1:1. Accordingly, in another aspect, a method of relithiating $Li_{(1-x)}MY$ to restore the Li:M ratio to about 1:1 is described, said method comprising grinding a lithium compound with $Li_{(1-x)}MY$ to form a relithiation mixture, optionally calcining said relithiation mixture, to yield LiMY, wherein M is a transition metal and Y is the counterbalancing anion. As is understood by the skilled artisan, calcination is carried out at temperatures below the melting point of the lithium:transition metal material but high enough to ensure that the lithium:transition metal material has a Li:M ratio of about one. In a preferred embodiment, the relithiation mixture is calcined at temperature in a range from about 500 to 800° C., preferably about 550 to about 650° C. for time in a range from about 1 hour to about 48 hours, preferably about 8 hours to about 16 hours. The lithium compound preferably comprises $Li_2CO_3$.

Accordingly, in another aspect, a method of recycling a lithium-ion battery to obtain a lithium:transition metal material having an Li:M atomic ratio of about 1:1 is described, said method comprising:
(a) separating a fraction from other components of the lithium-ion battery, wherein the fraction comprises at least one lithium:transition metal material, carbon and polymer binder,
(b) separating the polymer binder from the fraction to yield a solid mass comprising at least one lithium:transition metal material and carbon,
(c) contacting the solid mass with a formulation comprising at least one frothing agent and at least one collecting agent to form a mixture,
(d) introducing gas through the mixture in order to generate a froth layer,
(e) optionally adding water to the mixture;
(f) separating the froth layer from a liquid layer, wherein the froth layer comprises the carbon and the liquid layer comprises the at least one lithium:transition metal material,
(g) separating the at least one lithium:transition metal material from the liquid layer, and
(h) relithiating the lithium:transition metal material to obtain a Li:M atomic ratio of about 1:1, wherein M is a transition metal.
Relithiation is readily performed as described herein by combining the lithium:transition metal material with a lithium compound, e.g., $Li_2CO_3$, optionally calcining. Preferably, the collecting agent comprises limonene. Preferably, the frothing agent comprises terpineol. Preferably, the liquid layer is aqueous. Advantageously, the process does not require the use of any strong acids.

In one embodiment, a method of recycling a lithium ion battery to obtain at least one lithium:transition metal material comprising $LiCoO_2$ having an Li:Co ratio of about one is described, said method comprising:
(a) separating a fraction from other components of the lithium-ion battery, wherein the fraction comprises at least $Li_{(1-x)}MY$, carbon and polymer binder,
(b) separating the polymer binder from the fraction to yield a solid mass comprising at least $Li_{(1-x)}MY$ and carbon,
(c) contacting the solid mass with a formulation comprising at least one frothing agent and at least one collecting agent to form a mixture,
(d) introducing gas through the mixture in order to generate a froth layer,
(e) optionally adding water to the mixture;
(f) separating the froth layer from a liquid layer, wherein the froth layer comprises the carbon and the liquid layer comprises the $Li_{(1-x)}MY$,
(g) separating the $Li_{(1-x)}MY$ from the liquid layer, and
(h) relithiating the $Li_{(1-x)}MY$ to obtain $LiCoO_2$,
wherein M is a transition metal and Y is the counterbalancing anion.

Relithiation is readily performed as described herein by combing the lithium:transition metal material with a lithium compound, e.g., $Li_2CO_3$, optionally calcining. Preferably, the collecting agent comprises limonene. Preferably, the frothing agent comprises terpineol. Preferably, the liquid layer is aqueous. Advantageously, the process does not require the use of any strong acids.

Advantageously, the methods described herein allow for the separation of the lithium:transition metal compound from the lithium-ion battery, unlike the methods of the prior art which separate the lithium from the cobalt. Accordingly, no additional recombination step to transform the two fractions back into lithium:transition metal material is required. Moreover, renewable, biodegradable materials are used in the froth flotation step and the use of caustics and strong acids is not necessary. The separated carbon can be reclaimed and used in other industries, e.g., as a fuel, as filling in pavement, etc.

The features and advantages of the invention are more fully shown by the illustrative examples discussed below.

Example 1

Used laptop batteries were manually disassembled by breaking open the exterior plastic casing with a hammer to reveal the individual cells. Each cell was cryogenically cooled in liquid nitrogen, immobilized in a vise clamp, and the end was sawed off with a hacksaw. The steel casing was removed and the cathode was separated from the rest of the battery components.

The cathode foils were cut into 0.5"×0.5" squares and placed in a Speedmixer™ vial. N-methylpyrrolidone was added to cover the cathode foils, and the components were placed on the Speedmixer™ for 5 minutes to dissolve the polyvinylidene fluoride (PVdF) and remove the cathode materials from the aluminum foil. The resulting slurry was concentrated by centrifugation and collected by filtration.

The collected material from crushed lithium-ion batteries which was previously subject to removal of the binder were subjected to froth flotation using a novel frothing agent/collecting agent system to remove residual carbon. The following froth flotation experiments were performed. Thermogravimetric analysis (TGA) (20 to 850° C. at 20° C./min, followed by a 30 min hold at 850° C. under an atmosphere of air) was used to evaluate the purity of the lithium cobalt oxide material. Scanning electron microscopy (SEM)/energy-dispersive X-ray spectroscopy (EDS) was used to evaluate purity of the carbon layer.

A. 4.98 g of a dry cathode/anode mixture (70% cathode) was added to 60 mL of stirring water (275 rpm). Limonene (400 µL) and methyl isobutyl carbinol (MIBC, 50 µL) were added in succession. The mixture was allowed to stir for five minutes, at which point air (210 mL/min) was bubbled through the mixture in order to generate a froth layer. Water (40 mL) was added, and the carbon-rich froth layer was removed via mechanical skimming. The separated carbon-rich froth layer and lithium cobalt oxide-rich aqueous layer were filtered. 3.46 g of 92.5% pure lithium cobalt oxide and 1.05 g of 98% pure carbon was recovered.

B. 5.00 g of a dry cathode/anode mixture (70% cathode) was added to 60 mL of stirring water (275 rpm). Kerosene (200 µL) and terpineol (200 mg) were added as a solution. The mixture was allowed to stir for five minutes, at which point air (210 mL/min) was bubbled through the mixture in order to generate a froth layer. Water (40 mL) was added, and the carbon-rich froth layer was removed via mechanical skimming. The separated carbon-rich froth layer and lithium cobalt oxide-rich aqueous layer were filtered. 2.65 g of 97% pure lithium cobalt oxide and 1.61 g of 97.5% pure carbon were recovered.

C. 5.15 g of a dry cathode/anode mixture (70% cathode) was added to 60 mL of stirring water (275 rpm). Limonene (200 µL) and terpineol (200 mg) were added as a solution. The mixture was allowed to stir for five minutes, at which point air (210 mL/min) was bubbled through the mixture in order to generate a froth layer. Water (40 mL) was added, and the carbon-rich froth layer was removed via mechanical skimming. The separated carbon-rich froth layer and lithium cobalt oxide-rich aqueous layer were filtered. 3.40 g of 95% pure lithium cobalt oxide and 1.51 g of 98% pure carbon was recovered.

D. A 1:1 limonene/terpineol solution was prepared via dropwise addition of 7.50 mL trifluoroacetic acid to 20 mL limonene. The reaction was followed using nuclear magnetic resonance, monitoring for the formation of the intermediate trifluoroacetate (doublet at δ 1.50). When the limonene was ~50% consumed (1:1 ratio of limonene to intermediate trifluoroacetate), 20 mL of methanol followed by 4.00 g of sodium hydroxide were added, and the reaction was allowed to stir overnight. Sodium hydroxide quenched the residual acid and hydrolyzed the intermediate ester, delivering the desired ratio of limonene: terpineol.

E. Utilization of 400 µL of the solution described in part D with 5.00 g of a dry cathode/anode mixture (70% cathode) according to the procedure described in part C yielded 2.48 g of 99% pure lithium cobalt oxide and 2.08 g of 96% pure carbon.

Example 2

Experiments were performed with different combinations of frothing agents and collecting agents to compare best results. Prior to the testing of the method of the invention, the solids comprised $LiCoO_2$, plastic binder and carbon. The results are tabulated in Table 1 below.

TABLE 1

Recovery and purity results using different frothing and collecting agents.

| Collecting agent (kg/ton of solids) | Frothing agent (kg/ton of solids) | $LiCoO_2$ recovery (avg % yield) | $LiCoO_2$ purity (avg %) |
| --- | --- | --- | --- |
| kerosene (58) | MIBC (7) | 96% | 91% |
| kerosene (29) | terpineol (36) | 68% | 96% |
| limonene (61) | MIBC (7) | 96% | 91% |
| limonene (30) | terpineol (36) | 87% | 97% |
| limonene (61) | | 98% | poor |
| — | terpineol (72) | 94% | poor |
| crude mixture of limonene (32) and terpineol(35) produced in situ | | 73% | 99% |

Example 3

Because the lithium cobalt oxide in a lithium-ion battery becomes delithiated over the lifetime of the battery, the Li:Co ratio is preferably restored to 1:1 for reuse in a new battery. The recovered lithium cobalt oxide and an appropriate amount of lithium carbonate were placed in an amalgamator vial and processed in an amalgamator for 3 hours. For cases in which the relithiated material was to be calcined, the ratio of Li:Co was adjusted to 1.05:1. The material was then calcined at 850° C. for 12 hours. The Li:Co ratio of the lithium cobalt oxide powder was analyzed by atomic absorption spectroscopy. Advantageously, real time monitoring of the Li:Co ratio ensures that the correct amount of $Li_2CO_3$ is used.

Relithiation Example A: A 1.0 g sample of lithium cobalt oxide whose Li:Co ratio was determined to be 0.962444:1 was combined with 14.2 mg $Li_2CO_3$. The mixture was ground in an amalgamator for 3 hours.

Relithiation Example B: A 1.0 g sample of lithium cobalt oxide whose Li:Co ratio was determined to be 0.962444:1 was combined with 33.1 mg $Li_2CO_3$. The mixture was ground in an amalgamator for 30 minutes and then calcined at 850° C. for 12 hours.

A coating slurry was prepared with the recovered and relithiated lithium cobalt oxide, conductive carbon (<53 μm), polyvinylidene fluoride, and NMP such that the solids contained 85 wt % lithium cobalt oxide, 10 wt % conductive carbon, and 5 wt % PVdF. The slurry was then coated onto aluminum foil at a coating thickness of approximately 435 μm. The coated foils were dried at 80° C. at ambient pressure for 2 hours followed by drying at 80° C. under vacuum. Once dry, the foils were cut to the appropriate size for use in a test cell and densified on a Carver press at 4000 psi.

Battery testing was done using Swagelok-type cells composed of the $LiCoO_2$-coated Al foil as the cathode, a polypropylene separator, and lithium foil as the anode and reference electrode. The batteries were tested using a cyclic charge-discharge experiment at a rate of 0.8 C with a voltage finish of 1200 seconds. The batteries were cycled for 50 cycles, and the performance was evaluated based on retention of discharge capacity after 50 cycles. The results are tabulated in Table 2 below:

TABLE 2

Battery testing using relithiated lithium cobalt oxide recycled from used lithium ion batteries.

| battery tested | initial discharge time (sec) | discharge capacity retention (%) |
| --- | --- | --- |
| commercially coated | 3860 | 73.3 |
| commercial (coated in house) | 3910 | 79.3 |

TABLE 2-continued

Battery testing using relithiated lithium cobalt oxide recycled from used lithium ion batteries.

| battery tested | initial discharge time (sec) | discharge capacity retention (%) |
| --- | --- | --- |
| relithiated and calcined | 4467 | 85.1 |
| | 3910 | 94.6 |
| relithiated (grinding only) | 2345 | 3.8 |
| non-relithiated | 46 | 35.4 |
| | 41 | 28.2 |

Example 4

Relithiation Example C: A 1.0 g sample of lithium cobalt oxide whose Li:Co ratio was determined to be 0.962444:1 was combined with 33.1 mg $Li_2CO_3$. The mixture was ground in an amalgamator for 30 minutes and then calcined at 600° C. for 12 hours.

Relithiation Example D: A 3.0 g sample of lithium cobalt oxide whose Li:Co ratio was determined to be 0.962444:1 was combined with 99.3 mg $Li_2CO_3$. The mixture was ground in an amalgamator for 30 minutes and then calcined at 600° C. for 12 hours.

Relithiation Example E: A 6.0 g sample of lithium cobalt oxide whose Li:Co ratio was determined to be 0.962444:1 was combined with 198.6 mg $Li_2CO_3$. The mixture was ground in an amalgamator for 30 minutes and then calcined at 600° C. for 12 hours.

A coating slurry was prepared as previously described. The slurry was then coated onto aluminum foil at a coating thickness of approximately 489 μm. The coated foils were dried, cut, and densified as previously described.

Battery testing was done as previously described, using a cyclic charge-discharge experiment at a rate of 0.8 C with a voltage finish of 1200 seconds. A typical charge-discharge cycle was completed in approximately 0.8×3600 s=2800 s. The batteries were cycled for 40-50 cycles, and the performance was evaluated based on retention of discharge capacity after 50 cycles (40 where noted). The results are tabulated in Table 3 below:

TABLE 3

Battery testing using lithium cobalt oxide from recycled lithium ion batteries, relithiated at 600° C.

| battery tested | initial discharge time (sec) | discharge capacity retention (%) |
| --- | --- | --- |
| Commercial (coated in house) | 3021 | 59.6 |
| Relithiated and calcined (1 g scale) | 2556 | 97.8* |
| | 2012 | 94.4 |
| relithiated and calcined (3 g scale) | 2551 | 58.8* |
| relithiated and calcined (6 g scale) | 2956 | 64.3 |
| non-relithiated | 233 | 3.4 |

*after 40 cycles

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A method of separating carbon from at least one lithium:transition metal material, said method comprising contacting a solid mass comprising said carbon and at least one lithium:transition metal material with a formulation comprising at least one frothing agent and at least one collecting agent to form a mixture, introducing gas through the mixture in order to generate a froth layer, and separating the froth layer from a liquid layer, wherein the froth layer comprises the carbon and the liquid layer comprises the at least one lithium:transition metal material, wherein the at least one collecting agent comprises unsaturated hydrocarbon terpenes selected from the group consisting of limonene, phellandrenes, terpinenes, pinene, camphene, car-3-ene, sabinene, thujenes, allo-ocimene, ocimenes, myrcene, dihydromyrcene, and combinations thereof.

2. The method of claim 1, wherein the at least one lithium:transition metal material comprises $LiCoO_2$.

3. The method of claim 1, further comprising adding water to the mixture prior to bubbling.

4. The method of claim 1, wherein the at least one frothing agent comprises formally hydrated terpenes selected from the group consisting of terpineols, citronellol, menthol, linalool, borneol, isoborneol, fenchyl alcohol, dihydromyrcenol, nerol, and combinations thereof.

5. The method of claim 1, wherein the at least one frothing agent comprises at least one terpineol.

6. The method of claim 1, wherein the formulation is substantially devoid of methyl isobutyl carbinol.

7. The method of claim 1, wherein the method does not require the use of a strong acid.

8. The method of claim 1, wherein the formulation is substantially devoid of strong acid.

9. The method of claim 1, wherein the formulation is substantially devoid of kerosene.

10. The method of claim 1, wherein the separating comprises scraping, skimming of overflowing of a rim of a container.

11. The method of claim 1, further comprising separating the at least one lithium:transition metal material from the liquid layer.

12. The method of claim 1, further comprising separating a fraction from other components of a lithium-ion battery, wherein the fraction comprises at least one lithium:transition metal material, carbon and polymer binder, and separating the polymer binder from the fraction to yield a solid mass comprising at least one lithium:transition metal material and carbon.

13. The method of claim 1, further comprising relithiating the lithium:transition metal material to obtain a Li:M atomic ratio of about 1:1, wherein M is a transition metal.

14. The method of claim 1, wherein the froth layer is generated by bubbling gas through the mixture.

15. The method of claim 1, wherein the liquid layer is aqueous.

16. The method of claim 8, the strong acid is selected from the group consisting of sulfuric acid, nitric acid, perchloric acid, hydrochloric acid, hydrobromic acid, and hydroiodic acid.

17. A method of separating carbon from at least one lithium:transition metal material, said method comprising contacting a solid mass comprising said carbon and at least one lithium:transition metal material with a formulation comprising at least one frothing agent and at least one collecting agent to form a mixture, introducing gas through the mixture in order to generate a froth layer, and separating the froth layer from a liquid layer, wherein the froth layer comprises the carbon and the liquid layer comprises the at least one lithium:transition metal material, wherein the at least one collecting agent comprises limonene.

* * * * *